(12) United States Patent
Borschert et al.

(10) Patent No.: US 6,309,149 B1
(45) Date of Patent: Oct. 30, 2001

(54) TWIST DRILL FOR DRY DRILLING

(75) Inventors: Bernhard Borschert, Nürnberg; Jürgen Seidel, Oberreichenbach, both of (DE)

(73) Assignee: Kennametal PC Inc., Monrovia, CA (US)

( * ) Notice: Subject to any disclaimer, the term of this patent is extended or adjusted under 35 U.S.C. 154(b) by 0 days.

(21) Appl. No.: 09/471,768

(22) Filed: Dec. 23, 1999

Related U.S. Application Data

(63) Continuation-in-part of application No. PCT/EP98/03841, filed on Jun. 23, 1998.

(30) Foreign Application Priority Data

Jun. 25, 1997 (DE) ............................................. 197 26 984

(51) Int. Cl.[7] ................................................. B23B 51/02
(52) U.S. Cl. ......................... 408/230; 408/1 R; 408/227
(58) Field of Search ................................. 408/199, 227, 408/229, 230, 1 R

(56) References Cited

U.S. PATENT DOCUMENTS 2,396,335 * 3/1946 Moller .................................. 408/230
2,576,664   11/1951 Berlien .
4,231,692 * 11/1980 Brabetz et al. ...................... 408/230
4,594,034 *  6/1986 Maier .................................... 408/230
5,078,554    1/1992 Kubota .

FOREIGN PATENT DOCUMENTS

| 2655452 | 6/1978 | (DE) . |
| 3020948 | 12/1981 | (DE) . |
| 8522451 | 7/1986 | (DE) . |
| 0103235 | 3/1984 | (EP) . |
| 0249104 | 12/1987 | (EP) . |
| 0427857 | 5/1991 | (EP) . |
| 147631 | 7/1920 | (GB) . |
| 286458-A * | 1/1971 | (SU) .................................... 408/230 |

* cited by examiner

*Primary Examiner*—Steven C. Bishop
(74) *Attorney, Agent, or Firm*—Nils H. Ljungman & Associates; John J. Prizzi

(57) ABSTRACT

A drill used for dry drilling, characterized by the asymmetry of those cutting edge parts only whose faces are in the drill core area, in particular its entire chisel edge. This asymmetry can result from the fact that the individual chisel edges have different lengths.

20 Claims, 5 Drawing Sheets

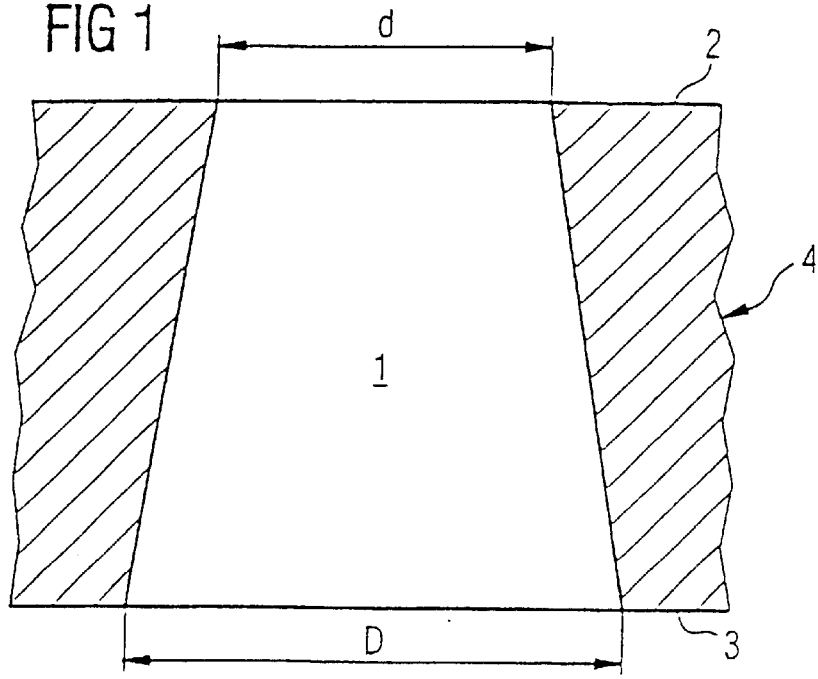
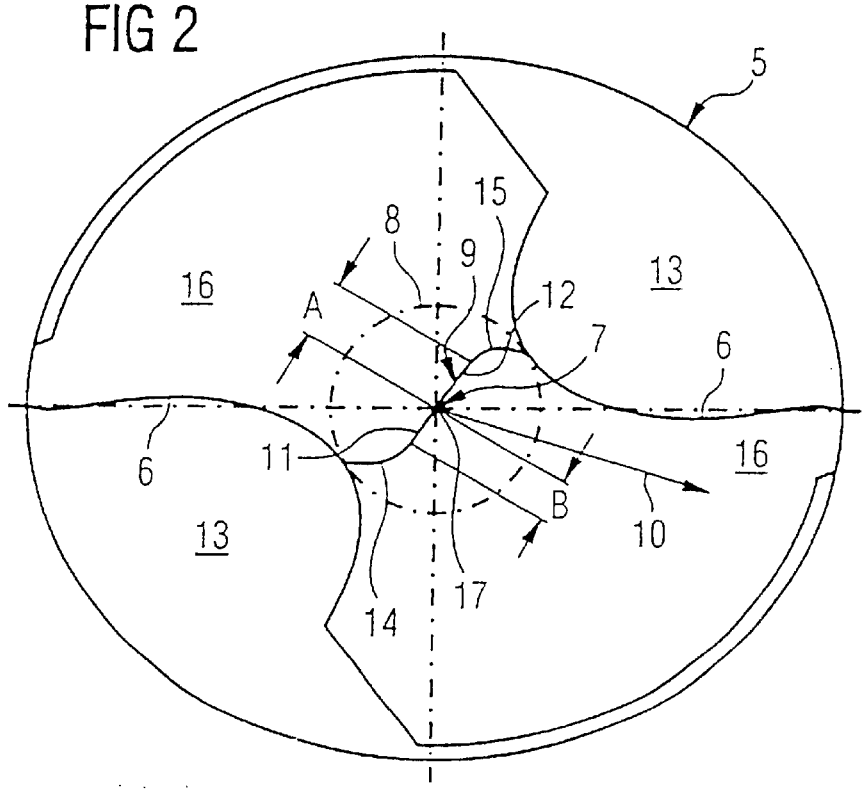

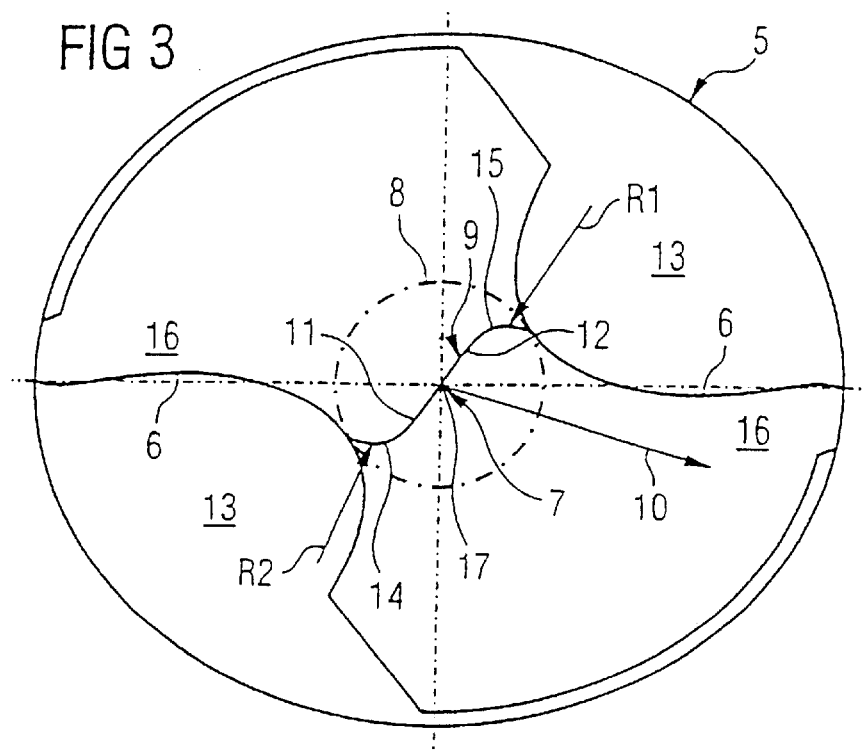
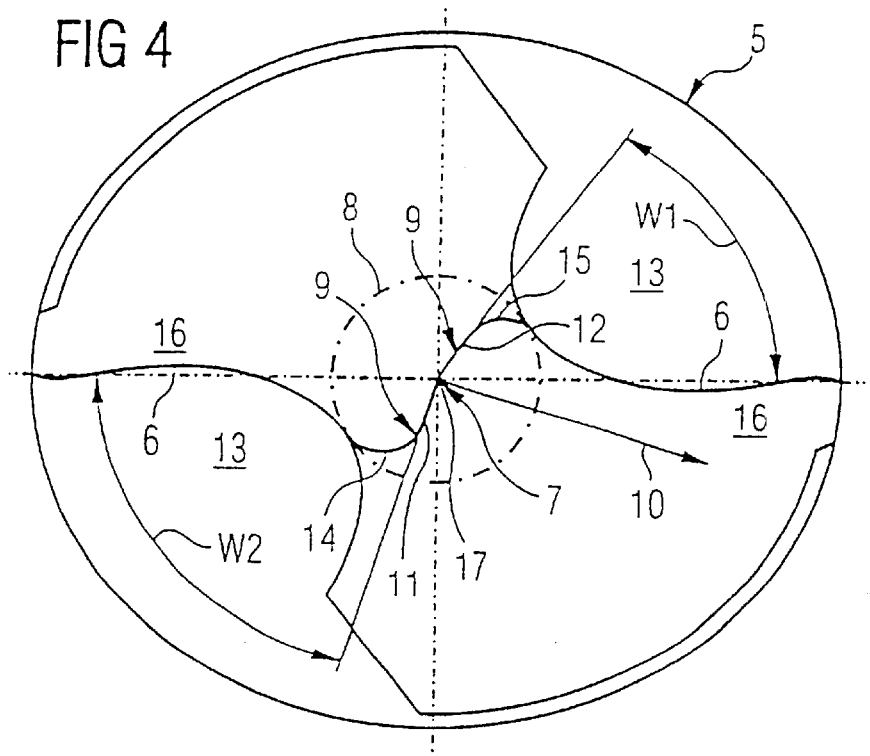

TWIST DRILL FOR DRY DRILLING

CONTINUING APPLICATION DATA

This application is a Continuation-In-Part application of International Patent Application No. PCT/EP98/03841, filed on Jun. 23, 1998, which claims priority from Federal Republic of Germany Patent Application No. 197 26 984.2, filed on Jun. 25, 1997. International Application No. PCT/EP98/03841 was pending as of the filing date of the above-cited application. The United States was an elected state in International Application No. PCT/EP98/03841.

BACKGROUND OF THE INVENTION

1. Field of the Invention

This invention relates to a twist drill preferably for dry drilling, which drill has a central center web with a drill tip lying on the drill axis, and with the drill axis as the axis of symmetry both of the chip flutes and also of the primary cutting edges, namely those parts of the cutting edges, the chip faces of which lie in the vicinity of the chip flutes.

2. Background Information

In at least one embodiment according to the present invention, the chip flutes and the drill center web are therefore substantially no different from those of an altogether standard drill, the chip flutes and drill center web of which are realized so that they are substantially symmetrical to the drill axis. The axial symmetry also relates to those parts of the cutting edges, the chip faces of which lie in the vicinity of the chip flutes.

The elimination of the need to add a drilling fluid or coolant-lubricant during drilling significantly reduces costs for disposal as well as the other well-known expenses that are incurred as a result of the use of the drilling fluid. In general, therefore, attempts are made to manufacture drills using such materials and having such cutting geometries that dry drilling is possible. On the other hand, dry drilling causes problems, such as difficulties in chip removal, increased wear on the cutting edges and the circular lands, severe heating of the drill, and when the drill is extracted at the end of the drilling process, loud noises and flying sparks, or even the breaking of the drill. Cutting force measurements show that during the retraction of the drill from the hole, torques can occur that even exceed the torque required for drilling. An additional force component that occurs during the retraction of the drill is a negative thrust force which can even lead to the tearing of the drill.

The problems observed during the retraction of the drill after the drilling process has been completed are caused by the increased heating of the drill in the vicinity of the drill cutting edges that occurs during dry drilling. This increased heating of the drill during the drilling process leads to a continuous increase in the diameter of the drill and thus also of the hole, which increases as the drilling depth increases. This phenomenon can easily be determined mathematically as a function of the temperature of the drill in its cutting area. In addition to the simple heat of chip removal caused by the chip formation, a further heating results from the friction of the circular lands or secondary cutting edges on the wall of the hole. At this point, no further cutting occurs, but rather a scraping with negative chip angles. However, the diameter enlargement related to the heating also has a disadvantageous effect at this point. In short, the consequence is that at the end of the drilling process, the diameter of the drill and accordingly the diameter of the hole are greater than at the beginning of the drilling. When the drill is retracted, this results in a severe jamming in the hole. One consequence of this jamming is an even more severe heating of the tool, the resulting further expansion, the above-mentioned loud drill noises and the significant increase in torque when the drill is retracted from the hole.

In the known technical literature, there are repeated references to the fact that the problems described above during dry drilling can be avoided by cooling the drill by means of compressed air. Other remedies include a minimal lubrication or the use of special lubricant coatings.

OBJECT OF THE INVENTION

The object of the invention is to create a drill for dry drilling which substantially eliminates or minimizes the disadvantages described above merely on the basis of its cutting edge geometry. The invention teaches that only those parts of its cutting edges, the chip faces of which lie in the vicinity of the center web diameter, in particular the drill chisel edges, have a deliberate asymmetry.

SUMMARY OF THE INVENTION

The known art (German Patent No. 26 55 452 A) already teaches, for drills used to drill printed circuit boards made of synthetic resin, to configure the entire drill cutting edges eccentrically, i.e. asymmetrically. In that case, however, the drill in question is for a special type of application, where the material to be drilled, namely the printed circuit boards made of synthetic resin, causes only low wear to the cutting edges. In that case, however, the special material causes the problem of the removal of the drilling dust, and, to solve that problem, the known art recommends a basically asymmetrical configuration of the cutting edges. A transfer of the solution applied there to universal drills is problematic, simply because the cut is no longer central. Asymmetrical cutting edges, e.g. primary or major cutting edges of different lengths, also lead to an undesirable drilling result. The applicable theory in the field of drill design is aimed at avoiding such a situation at all costs, i.e. differences in the tip angle or an eccentric location of the drill tip and differences in the height of the cutting edges of the primary cutting edges. Even differences in the height of the cutting edges specifically result in different chip cross sections, and significantly increase the wear of the drill.

A drill of the known art described in U.S. Pat. No. 5,078,554 and corresponding European Patent No. 0 427 857 B1 has an asymmetrical center web diameter and asymmetrical chip flutes—each in relation to the axis of the drill. Accordingly, the curve of the chisel edges is also asymmetrical. The total asymmetry of this drill is intended to avoid an excessive enlargement of the hole being drilled as the depth of drilling increases, a phenomenon that the object of the current application not only accepts but even strives for. One primary application in particular is the machining of crankshafts for purposes of balancing said crankshafts. The holes are thereby made to alter the balance of the crankshaft. The drilling process is performed on the balancing machine itself, namely to balance the chucked crankshaft, the chucking of which does not need to be changed to change the balance. Sensors associated with the balancing machine are used for the balancing. The accuracy and precision of the work, however, are negatively influenced by cooling water or sprayed water. Therefore, under the conditions described above, dry drilling must be performed. In that case, it is less a question of the accuracy and precision of the hole drilled than the rapid and controlled removal of material.

Compared to the solutions of the known art explained above, the asymmetry taught by the present invention is essentially restricted to the design of the drill tip, namely to the configuration of the chisel edges, without practically any influence on the primary cutting edges. Therefore the area of the cutting edges that lies in front of the drill center web in the axial direction can therefore be affected by the desired asymmetry. As a result of the solution taught by the present invention, the drill cuts substantially free eccentrically during drilling. The attack can be so effective that the drill initially drills in or taps centrally. The drill tip can lie on the drill axis. As the drilling proceeds, the asymmetrical portions of practically the chisel edges are engaged. Pressure components can be generated by their asymmetrical portions that, during the drilling process, cause the drill to deviate from the ideal line specified by the drilling axis radially toward the center line between the cutting edges. Thus, as the drill rotates, a hole can be produced, the diameter of which can be approximately 0.01% to 1% larger than the actual diameter of the drill. During the retraction of the drill, the jamming of the drill in the hole is thereby substantially prevented, as can be determined by a measurement of the cutting force. Disadvantages of the type that would be expected with the asymmetrical configuration of the primary cutting edges, as in the known art described in German Patent No. 26 55 452 A, are here largely avoided. The volume to be cut by the two individual chisel edges can remain essentially identical, in spite of the deliberate asymmetry.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The object of the invention is explained in greater detail below, with reference to the exemplary embodiments that are illustrated in the accompanying figures, in which:

FIG. 1 is a not-to-scale view of a section through a hole basically produced by dry drilling;

FIG. 2 is an overhead view of the drill tip with individual chisel edges of different lengths;

FIG. 3 is an overhead view of the drill tip, analogous to FIG. 2, with different radii on the transition between the primary cutting edges and the individual chisel edges;

FIG. 4 is an overhead view of the drill tip, analogous to FIGS. 2 or 3, with different angular positions of the individual chisel edges with respect to the associated primary cutting edges;

DESCRIPTION OF THE PREFERRED EMBODIMENT

Figure 5:
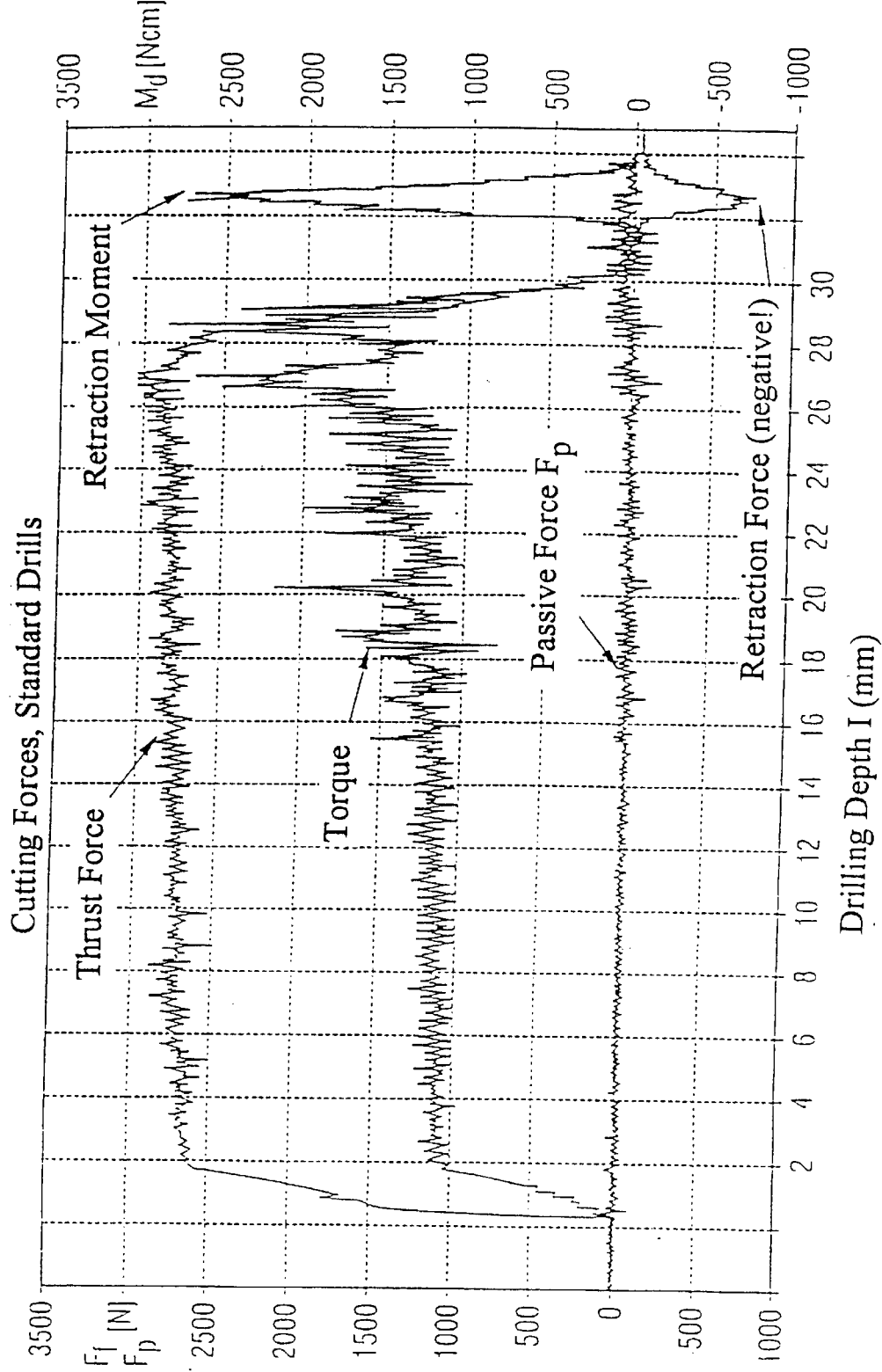
FIG. 5 is a diagram of the cutting force over the drilling depth for a conventionally configured drill of the known art.

The drill hole 1 shown in cross section in FIG. 1 is introduced from the top 2 toward the bottom 3 of the tool or item or material to be drilled 4. The letter d identifies the hole diameter at the time of the entrance of the drill and the letter D identifies the hole diameter at the time of the exit of the drill. The effective diameter of the hole 1, which expands from the drill entry (d) to the drill exit (D), results from the continuous heating of the drill, in particular in the vicinity of the drill cutting edges, during the drilling process. The conicity illustrated in FIG. 1 is significantly exaggerated compared to the actual drilling situation, for purposes of emphasis.

The drill, which is designated 5 overall, contains the two primary cutting edges 6. The chip faces 16 of the primary cutting edges 6 lie in the vicinity of the chip flutes or chip grooves 13. The primary cutting edges 6 are symmetrical with respect to the drill axis 7, which runs perpendicular to the plane of the drawings in FIGS. 2–4 and contains the drill tip 17. The drill center web 8, which is indicated by a circle drawn in a broken or dot-dash line, is spanned on its end surface containing the drill tip 17 by the total chisel edge 9. The chisel edge 9 is characterized, when seen in an overhead view of the drill tip 17 (FIGS. 2–4) by an S-shape, which with its two curved edges transitions into or forms an oblique angle W1 or W2 with respect to the primary cutting edges 6 (FIG. 4), namely in the radial direction 10 outward in relation to FIGS. 2–4.

The total chisel edge 9 is formed by two individual chisel edges 11, 12, the chip faces of which lie in the vicinity of the drill center web 8, and which extend outward from the drill axis 7 in the radial direction 10 to the chip flutes or chip grooves 13. The two individual chisel edges 11, 12, in the exemplary embodiment illustrated in FIG. 2, have different lengths up to their transition into their chisel edge radii 14, 15, as indicated by the different dimensions A and B in FIG. 2. In the exemplary embodiment illustrated in FIG. 3, the chisel edge radii 14, 15 differ from each other, as indicated in FIG. 3 by the arrows R1 and R2. As shown in the embodiment illustrated in FIG. 4, the individual chisel edges 11, 12 that start at the drill axis 7 can also enclose different angles with their respective primary cutting edges 6, as shown in FIG. 4 by different angular measurements W1 and W2. To achieve the desired asymmetry, therefore, the variable parameters that are available include the lengths A and B (FIG. 2), the individual chisel edges 11, 12, the chisel edge radii R1 and R2 (FIG. 3), and/or the different angles W1 and W2. The desired asymmetry or the desired asymmetries can be achieved both by differences in only one of the parameters listed above, or differences in two parameters together, or for that matter differences in all three parameters.

For example, in at least one embodiment of the present invention, the difference between length A and length B of the individual chisel edges 11, 12, can possibly be at least about 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40% or greater, or less such as 4%, 3%, 2% or 1%. For further example, if the ratio of length A to length B is 1.05, length A is therefore 5% greater than length B. If the ratio of length A to length B is 1.10, then length A is 10% greater than length B. If the ratio of length A to length B is 1.15, then length A is 15% greater than length B.

For example, in at least one embodiment of the present invention, the difference between the radii R1 and R2 of the individual chisel edges 11, 12, can possibly be at least about 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, or greater, or less such as 5%, 6%, 7%, 8%, or 9%. For further example, if the ratio of radius R1 to radius R2 is 1.10, radius R1 is therefore 10% greater than radius R2. If the ratio of radius R1 to radius R2 is 1.15, then radius R1 is 15% greater than radius R2. If the ratio of radius R1 to radius R2 is 1.20, then radius R1 is 20% greater than radius R2.

For example, in at least one embodiment of the present invention, the difference between the angles W2 and W1 can possibly be about 1°, 1.25°, 1.5°, 1.75°, 2°, 2.25°, 2.5°, 2.75°, 3°, 3.25°, 3.5°, 3.75°, 4°, 4.25°, 4.5°, 4.75°, 5°, 6°, 7°, 8°, 9°, 10° or greater, or less such as 0.25%, 0.50%, or 0.75%.

It is to be understood that any of the percentages, ratios, or degrees listed above are examples of the dimensions that may be utilized in at least one embodiment according to the present invention. It is to be further understood that one skilled in the art to which the present invention most nearly pertains would be able to modify any or all of the above dimensions in at least one embodiment of the present invention.

Further, depending on the various factors involved, in at least one other embodiment of the present invention, the dimensions of the drill, in particular the chisel edges, could be modified. Such factors as the desired size and depth of the hole to be drilled, the type of material to be drilled, the desired length, width, and circumference of the drill, the type of material the drill is made of, and the desired rotation or gyration of the drill all would affect the necessary dimensions and asymmetrical measurements of the drill. A person skilled in the art to which the present invention most nearly pertains would be able to selectively modify the dimensions to accommodate the requirements of the factors listed hereinabove.

In at least one other embodiment according to the present invention, the circumferential shape of the drill may be one of: elliptical, circular, or oval-shaped.

From a quantitative point of view, differences in diameters, as shown above, have been found to be advantageous. The asymmetries claimed by the invention are generally used on two-lip center web drills. However, they can also be used to particular advantage on three-lip center web drills, because a three-lip center web drill is supported statically with its cutting edges on the drill wall, and therefore makes a radial excursion more difficult than with an only two-lip center web drill.

The manufacturing method and the geometry of the primary cutting edges 6 are the same as for the object of European Patent No. 0 249 104 B1.

FIG. 5 is a diagram showing measurements of the cutting force over the length of drilling depth for a conventionally configured drill of the known art.

Figure 6:
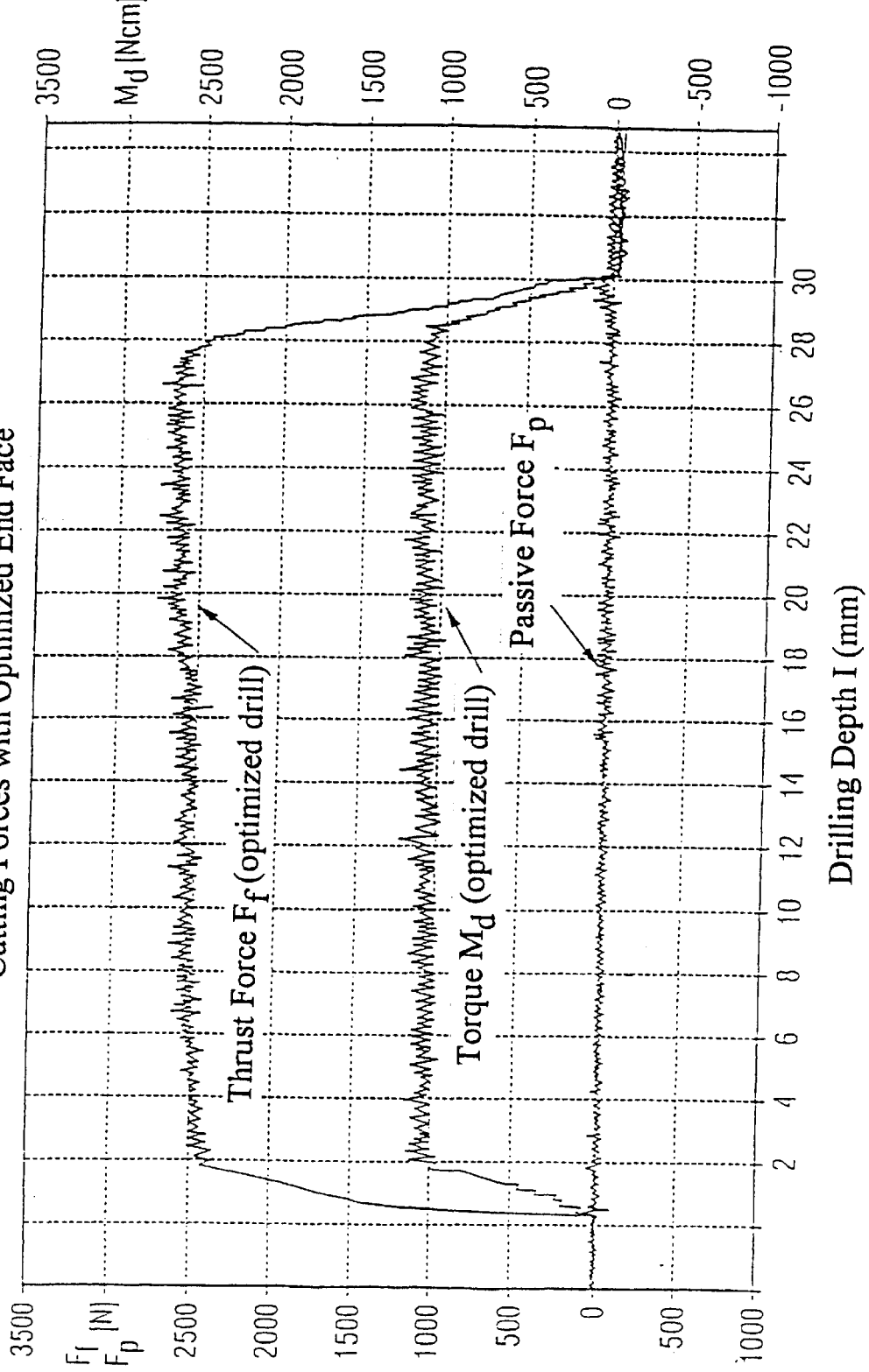
FIG. 6 is a diagram of the cutting force analogous to FIG. 5 of a drill equipped with a chisel edge as in at least one embodiment of the present invention.

FIG. 6 is a diagram, similar to the diagram in FIG. 5, showing measurements of the cutting force over the length of the drilling depth for a drill equipped with a chisel edge as in at least one embodiment of the present invention.

Figure 7:
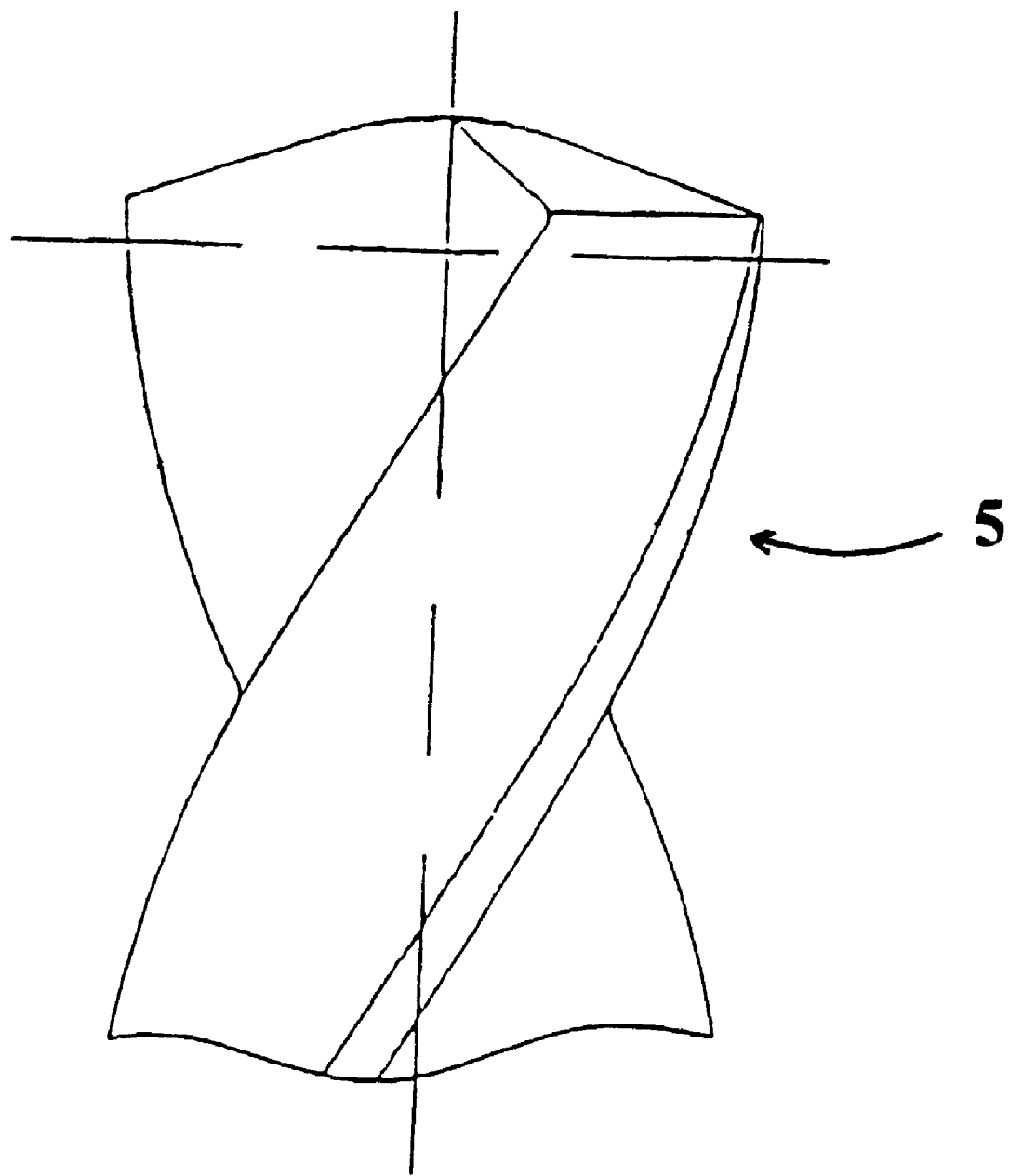
FIG. 7 is a view of a twist drill according to at least one embodiment of the present invention.

FIG. 7 shows the twist drill 5 according to at least one embodiment of the present invention.

One feature of the invention resides broadly in the twist drill for dry drilling with a central center web 8 with a drill tip 17 lying on the drill axis 7, and with the drill axis 7 as the axis of symmetry both of the chip flutes 13 and also of the primary cutting edges 6, namely those parts of the cutting edges, the chip faces 16 of which lie in the vicinity of the chip flutes 13, characterized by an asymmetry of those parts of its cutting edges, the chip faces of which lie in the vicinity of the drill center web 8, in particular of its overall chisel edge 9.

Another feature of the invention resides broadly in the drill characterized by the fact that the parts of its cutting edges that extend from the drill axis 7 essentially in the radial direction 10, and the chip faces of which lie in the vicinity of the center web diameter, in particular the individual chisel edges 11, 12, have different lengths A, B.

Yet another feature of the invention resides broadly in the drill characterized by the fact that the parts of its cutting edges that extend from the drill axis 7 essentially radially, and the chip faces of which lie in the vicinity of the center web diameter, in particular the individual chisel edges 11, 12 have different radii R1, R2 at the transition between the primary cutting edge 6 and the chisel edge 9.

Still another feature of the invention resides broadly in the drill characterized by the fact that the parts its cutting edges that extend from the drill axis 7 essentially radially, and the chip faces of which lie in the vicinity of the center web diameter, in particular the individual chisel edges 11, 12 enclose different angles W1, W2 with the corresponding respective primary cutting edge 6 FIG. 4.

A further feature of the invention resides broadly in the drill characterized by the fact that the difference in length A–B of the parts of its cutting edges, the chip faces of which lie in the vicinity of the center web diameter, in particular of the individual chisel edges 11, 12, is at least 5%.

Another feature of the invention resides broadly in the drill characterized by the fact that the difference between the radii R2–R1 is at least 10%.

Yet another feature of the invention resides broadly in the drill characterized by the fact that the angle difference W2–W1 is at least 1 degree.

Still another feature of the invention resides broadly in the drill characterized by two drill cutting edges 6.

A further feature of the invention resides broadly in the drill characterized by three drill cutting edges 6.

Examples of twist drills which could possibly be utilized or adapted for use in at least one embodiment according to the present invention may be found in the following U.S. Pat. No. 5,931,615, issued on Aug. 3, 1999 to inventor Wiker; U.S. Pat. No. 5,685,673, issued on Nov. 11, 1997 to inventor Jarvis; U.S. Pat. No. 5,678,960, issued on Oct. 21, 1997 to inventors Just, et al.; U.S. Pat. No. 5,622,462, issued on Apr. 22, 1997 to inventors Gakhar, et al.; U.S. Pat. No. 5,590,987, issued on Jan. 7, 1997 to inventor Bouzonie; U.S. Pat. No. 5,492,187, issued on Feb. 20, 1996 to inventors Neukirchen, et al.; U.S. Pat. No. 5,442,979, issued on Aug. 22, 1995 to inventor Hsu; U.S. Pat. No. 5,380,133, issued on Jan. 10, 1995 to inventor Schimmer; U.S. Pat. No. 5,350, 261, issued on Sep. 27, 1994 to inventors Takaya, et al.; U.S. Pat. No. 5,230,593, issued on Jul. 27, 1993 to inventors Imanaga, et al.; U.S. Pat. No. 5,186,584, issued on Feb. 16, 1993 to inventors Muller, et al.; U.S. Pat. No. 5,088,863, issued on Feb. 18, 1992 to inventors Imanaga, et al.; and U.S. Pat. No. 5,035,552, issued on Jul. 30, 1991 to inventors Lysenko, et al.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Federal Republic of Germany Patent Application No. 197 26 984.2, filed on Jun. 25, 1997, having inventor Bernhard Borschert, and DE-OS 197 26 984.2 and DE-PS 197 26 984.2 and International Application No. PCT/EP98/03841, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A twist drill for dry drilling, said drill comprising:
   a tip portion;
   a body portion disposed adjacent said tip portion;
   a central longitudinal axis;
   said tip portion being substantially cone-shaped;
   said tip portion having a base portion and a top portion;
   said base portion being substantially wider than said top portion;
   said base portion being disposed immediately adjacent said body portion of said drill;
   said top portion being disposed on said tip portion opposite said base portion;
   said tip portion comprising:
      a first chip face forming a portion of said conical surface of said tip portion;
      a second chip face forming a portion of said conical surface of said tip portion;
      a chisel edge arrangement configured to initiate dry cutting of a metal object to be dry drilled;
      said chisel edge arrangement being disposed between said first chip face and said second chip face;
      said first chip face having a first end disposed adjacent said chisel edge arrangement and a second end disposed opposite said first end and adjacent said body portion of said drill;
      said second chip face having a first end disposed adjacent said chisel edge arrangement and a second end disposed opposite said first end and adjacent said body portion of said drill;
      said first chip face being configured to extend monotonically away from said body portion to said chisel edge arrangement disposed on said top of said tip portion;
      said second chip face being configured to extend monotonically away from said body portion to said chisel edge arrangement disposed on said top of said tip portion;
      said first chip face being disposed to meet said second chip face at said top of said tip portion; and
      said chisel edge arrangement comprising:
         a first chisel edge portion;
         a second chisel edge portion;
         each of said chisel edge portions being disposed to extend away from each other from said central longitudinal axis; and
         said first chisel edge portion and said second chisel edge portion being asymmetric with respect to one another about said central longitudinal axis;
      said body portion comprising:
         a first chip flute;
         a second chip flute; and
         said first chip flute and said second chip flute being symmetric with respect to one another about said central longitudinal axis;
   a first cutting edge, configured to dry drill, being disposed between said tip portion and said body portion;
   a second cutting edge, configured to dry drill, being disposed between said tip portion and said body portion;
   said first cutting edge and said second cutting edge being substantially symmetric with respect to one another about said central longitudinal axis;
   said first chip flute being disposed to extend along said body portion from said first cutting edge; and
   said second chip flute being disposed to extend along said body portion from said second cutting edge.

2. The twist drill for dry drilling according to claim 1, wherein:
   said first chisel edge portion has a first end and a second end opposite said first end;
   said second chisel edge portion has a first end and a second end opposite said first end;
   said first end of said first chisel edge portion is disposed to meet said first end of said second chisel edge portion at said central longitudinal axis;
   said symmetry of said first cutting edge and said second cutting edge with respect to one another about said central longitudinal axis is defined by a plurality of points on said first cutting edge and a plurality of corresponding points on said second cutting edge, such that a straight line drawn from any one of said points on said first cutting edge to its corresponding point on said second cutting edge goes through said central longitudinal axis, and such that the distance between any one of said points on said first cutting edge and said central longitudinal axis is substantially equal to the distance between a corresponding one of said points on said second cutting edge and said central longitudinal axis;

said first chisel edge portion comprises a first section having a first radius of curvature;

said second chisel edge portion comprises a second section having a second radius of curvature; and said first radius of curvature has a different radius than said second radius of curvature.

3. The twist drill for dry drilling as claimed in claim 2, wherein:

said tip portion comprises a drill tip with a web disposed about the drill tip, which drill tip lies on the central longitudinal axis;

said chisel edge portions have different lengths, the difference of which is at least 5%;

the difference between the radius of the first radius of curvature and the radius of the second radius of curvature is at least about 10%; and said chisel edges each enclose different angles with respect to their corresponding cutting edge, the difference of which angles enclosed by the chisel edges and their corresponding cutting edges is at least about 1 degree.

4. The twist drill for dry drilling as claimed in claim 1, wherein:

said tip portion comprises a drill tip with a web disposed about the drill tip, which drill tip lies on the central longitudinal axis;

said chisel edge portions have different lengths;

said first chisel edge portion comprises a first section having a first radius of curvature;

said second chisel edge portion comprises a second section having a second radius of curvature;

said first radius of curvature has a different radius than said second radius of curvature; and said chisel edges each enclose different angles with respect to their corresponding cutting edge.

5. The twist drill for dry drilling as claimed in claim 4, wherein:

the difference in length of the chisel edges is at least about 5%;

the difference between the radius of the first radius of curvature and the radius of the second radius of curvature is at least about 10%; and the difference in the angles enclosed by the chisel edges and their corresponding cutting edges is at least about 1 degree.

6. The twist drill for dry drilling as claimed in claim 5, wherein the drill comprises one of two cutting edges or three cutting edges.

7. A method for dry drilling utilizing a twist drill for dry drilling, said drill comprising: a tip portion; a body portion disposed adjacent said tip portion; a central longitudinal axis; said body portion having an axis of rotation lying along said central longitudinal axis; said tip portion being substantially cone-shaped; said tip portion having a base portion and a top portion; said base portion being substantially wider than said top portion; said base portion being disposed immediately adjacent said body portion of said drill; said top portion being disposed opposite said base portion; said tip portion comprising: a first chip face forming a portion of said conical surface of said tip portion; a second chip face forming a portion of said conical surface of said tip portion; a chisel edge arrangement configured to initiate dry cutting of a metal object to be dry drilled; said chisel edge arrangement being disposed between said first chip face and said second chip face; said first chip face having a first end disposed adjacent said chisel edge arrangement and a second end disposed opposite said first end and adjacent said body portion of said drill; said second chip face having a first end disposed adjacent said chisel edge arrangement and a second end disposed opposite said first end and adjacent said body portion of said drill; said first chip face being configured to extend monotonically away from said body portion to said chisel edge arrangement disposed on said top of said tip portion; said second chip face being configured to extend monotonically away from said body portion to said chisel edge arrangement disposed on said top of said tip portion; said first chip face being disposed to meet said second chip face at said top of said tip portion; and said chisel edge arrangement comprising: a first chisel edge portion; a second chisel edge portion; each of said chisel edge portions being disposed to extend away from each other from said central longitudinal axis; and said first chisel edge portion and said second chisel edge portion being asymmetric with respect to one another about said central longitudinal axis; said body portion comprising: a shank portion; a middle portion; an end portion; said end portion being disposed adjacent said tip portion; said middle portion being disposed between said shank portion and said end portion; a first chip flute; and a second chip flute; a first cutting edge, configured to dry drill, being disposed between said tip portion and said body portion; a second cutting edge, configured to dry drill, being disposed between said tip portion and said body portion; said first cutting edge and said second cutting edge being substantially symmetric with respect to one another about said central longitudinal axis; said first chip flute being disposed to extend along said body portion from said first cutting edge; and said second chip flute being disposed to extend along said body portion from said second cutting edge; said method comprising the steps of:

contacting with said chisel edge arrangement a metal object to be dry drilled;

dry drilling in a direction along said axis of rotation of said body portion of said drill;

generating a deviation of said tip portion from the drilling direction along said axis of rotation of said body portion of said drill with said asymmetric chisel edge portions;

producing an entrance hole with said deviation of said tip portion of said drill to produce an entrance hole larger in diameter than said diameter of said end portion of said drill to permit withdrawal of said end portion after expansion of said end portion due to further heating of said end portion during further dry drilling;

continuing dry drilling and thereby heating said end portion, causing said end portion to expand in diameter;

continuing dry drilling with said expanded end portion to produce a hole beyond said entrance hole;

continuing dry drilling until a predetermined depth of said hole is reached;

and withdrawing said expanded end portion from the metal object without substantial jamming of at least the end portion of said drill in said entrance hole.

8. The method of dry drilling as claimed in claim 7, wherein the tip portion comprises a drill tip with a web disposed about the drill tip, which drill tip lies on the central axis, and the chisel edge portions have different lengths, which difference in length is at least 5%.

9. The method of dry drilling as claimed in claim 8, wherein the chisel edge portions each have different radii at the transition between the primary cutting edge and the chisel edge, and each enclose different angles with the corresponding respective primary cutting edge.

10. The method of dry drilling as claimed in claim 9, wherein:
the difference between the radii is at least about 10%;
the angle difference is at least about 1 degree; and
the drill comprises one of two cutting edges or three cutting edges.

11. A twist drill for dry drilling a metal object, said drill comprising:
a tip portion;
a body portion disposed adjacent said tip portion;
a central longitudinal axis;
said tip portion comprising:
 a chisel edge arrangement configured to initiate dry cutting of a metal object to be dry drilled; and
 said chisel edge arrangement comprising:
  a first chisel edge portion;
  a second chisel edge portion;
  said first chisel edge portion having a first end and a second end opposite said first end;
  said second chisel edge portion having a first end and a second end opposite said first end;
  said first end of said first chisel edge portion being disposed to meet said first end of said second chisel edge portion at said central longitudinal axis;
  each of said chisel edge portions being disposed to extend away from each other from said central longitudinal axis; and
  said first chisel edge portion and said second chisel edge portion being asymmetric with respect to one another about said central longitudinal axis;
said body portion comprising:
 a first chip flute; and
 a second chip flute;
a first cutting edge, configured to dry drill, being disposed between said tip portion and said body portion;
a second cutting edge, configured to dry drill, being disposed between said tip portion and said body portion;
said first cutting edge and said second cutting edge being substantially symmetric with respect to one another about said central longitudinal axis;
said first chip flute being disposed to extend along said body portion from said first cutting edge; and
said second chip flute being disposed to extend along said body portion from said second cutting edge.

12. The twist drill for dry drilling as claimed in claim 11, wherein:
said tip portion comprises a drill tip with a web disposed about the drill tip, which drill tip lies on the central longitudinal axis;
said chisel edge portions have different lengths;
said first chisel edge portion comprises a first section having a first radius of curvature;
said second chisel edge portion comprises a second section having a second radius of curvature;
said first radius of curvature has a different radius than said second radius of curvature; and
said chisel edges each enclose different angles with respect to their corresponding cutting edge.

13. The twist drill for dry drilling as claimed in claim 12, wherein:
the difference in length of the chisel edges is at least about 5%;
the difference between the radius of the first radius of curvature and the radius of the second radius of curvature is at least about 10%; and
the difference in the angles enclosed by the chisel edges and their corresponding cutting edges is at least about 1 degree.

14. A twist drill for dry drilling, said drill comprising:
a tip portion;
a body portion disposed adjacent said tip portion;
a central longitudinal axis;
said tip portion comprising:
 a first chip face forming a portion of said surface of said tip portion;
 a second chip face forming a portion of said surface of said tip portion;
 a chisel edge arrangement configured to initiate dry cutting of a metal object to be dry drilled;
 said first chip face being disposed to meet said second chip face at said chisel edge arrangement; and
 said chisel edge arrangement comprising:
  a first chisel edge portion;
  a second chisel edge portion;
  each of said chisel edge portions being disposed to extend away from each other from said central longitudinal axis; and
  said first chisel edge portion and said second chisel edge portion being asymmetric with respect to one another about said central longitudinal axis;
said body portion comprising:
 a first chip flute; and
 a second chip flute;
a first cutting edge, configured to dry drill, being disposed between said tip portion and said body portion;
a second cutting edge, configured to dry drill, being disposed between said tip portion and said body portion;
said first cutting edge and said second cutting edge being symmetric with respect to one another about said central longitudinal axis;
said symmetry of said first cutting edge and said second cutting edge with respect to one another about said central longitudinal axis being defined by a plurality of points on said first cutting edge and a plurality of corresponding points on said second cutting edge, such that a straight line drawn from any one of said points on said first cutting edge to its corresponding point on said second cutting edge goes through said central longitudinal axis, and such that the distance between any one of said points on said first cutting edge and said central longitudinal axis is substantially equal to the distance between a corresponding one of said points on said second cutting edge and said central longitudinal axis;
said first chip flute being disposed to extend along said body portion from said first cutting edge; and
said second chip flute being disposed to extend along said body portion from said second cutting edge.

15. The twist drill for dry drilling as claimed in claim 14, wherein:
said tip portion comprises a drill tip with a web disposed about the drill tip, which drill tip lies on the central longitudinal axis;

said chisel edge portions have different lengths;

said first chisel edge portion comprises a first section having a first radius of curvature;

said second chisel edge portion comprises a second section having a second radius of curvature;

said first radius of curvature has a different radius than said second radius of curvature; and said chisel edges each enclose different angles with respect to their corresponding cutting edge.

16. The twist drill for dry drilling as claimed in claim 15, wherein:

the difference in length of the chisel edges is at least about 5%;

the difference between the radius of the first radius of curvature and the radius of the second radius of curvature is at least about 10%; and the difference in the angles enclosed by the chisel edges and their corresponding cutting edges is at least about 1 degree.

17. A twist drill for dry drilling a metal object, said drill comprising:

a tip portion;

a body portion disposed adjacent said tip portion;

a central longitudinal axis;

said tip portion comprising:

a chisel edge arrangement configured to initiate dry cutting of a metal object to be dry drilled; and said chisel edge arrangement comprising:

a first chisel edge portion;

a second chisel edge portion;

each of said chisel edge portions being disposed to extend away from each other from said central longitudinal axis; and said first chisel edge portion and said second chisel edge portion being asymmetric with respect to one another about said central longitudinal axis;

said body portion comprising:

a first chip flute; and a second chip flute;

a first cutting edge, configured to dry drill, being disposed between said tip portion and said body portion;

a second cutting edge, configured to dry drill, being disposed between said tip portion and said body portion;

said first cutting edge and said second cutting edge being substantially symmetric with respect to one another about said central longitudinal axis;

said first chisel edge portion comprising a first section having a first radius of curvature;

said second chisel edge portion comprising a second section having a second radius of curvature;

said first radius of curvature having a different radius than said second radius of curvature;

said first chip flute being disposed to extend along said body portion from said first cutting edge; and said second chip flute being disposed to extend along said body portion from said second cutting edge.

18. The twist drill for dry drilling as claimed in claim 17, wherein:

said tip portion comprises a drill tip with a web disposed about the drill tip, which drill tip lies on the central longitudinal axis;

said chisel edge portions have different lengths; and said chisel edges each enclose different angles with respect to their corresponding cutting edge.

19. The twist drill for dry drilling as claimed in claim 18, wherein:

the difference in length of the chisel edges is at least about 5%;

the difference between the radius of the first radius of curvature and the radius of the second radius of curvature is at least about 10%; and the difference in the angles enclosed by the chisel edges and their corresponding cutting edges is at least about 1 degree.

20. A method for dry drilling utilizing a twist drill for dry drilling, said drill comprising a tip portion; a body portion disposed adjacent said tip portion; a central longitudinal axis; said tip portion being substantially cone-shaped; said tip portion having a base portion and a top portion; said base portion being substantially wider than said top portion; said base portion being disposed immediately adjacent said body portion of said drill; said top portion being disposed opposite said base portion; said body portion having an axis of rotation lying along said central longitudinal axis; said body portion comprising: a shank portion; a middle portion; an end portion; said end portion being disposed adjacent said tip portion; said middle portion being disposed between said shank portion and said end portion; said method comprising the steps of:

contacting with a chisel edge arrangement of a drill a metal object to be dry drilled;

dry drilling in a direction along said axis of rotation of said body portion of said drill;

generating a deviation of said tip portion of said drill from the drilling direction along said axis of rotation of said body portion of said drill with said chisel edge arrangement;

producing an entrance hole with said deviation of said tip portion of said drill to produce an entrance hole larger in diameter than said diameter of said end portion of said drill to permit withdrawal of said end portion after expansion of said end portion due to further heating of said end portion during further dry drilling;

continuing dry drilling and thereby heating said end portion, causing said end portion to expand in diameter;

continuing dry drilling with said expanded end portion to produce a hole beyond said entrance hole;

continuing dry drilling until a predetermined depth of said hole is reached; and withdrawing said expanded end portion from the metal object without substantial jamming of at least the end portion of said drill in said entrance hole.

* * * * *